United States Patent [19]

Schimmelpfennig

[11] Patent Number: 5,033,698
[45] Date of Patent: Jul. 23, 1991

[54] GUIDED KITE WITH STABLE YET ADJUSTABLE CURVE PROFILE

[76] Inventor: Wolfgang Schimmelpfennig, Katnerweg 28, D-2000 Hamburg 65, Fed. Rep. of Germany

[21] Appl. No.: 404,977

[22] Filed: Sep. 7, 1989

[30] Foreign Application Priority Data

Sep. 7, 1988 [DE] Fed. Rep. of Germany ....... 8811274

[51] Int. Cl.[5] ............................ A63H 27/08; B64C 31/06
[52] U.S. Cl. .............................. 244/153 R; 244/155 A; 244/902
[58] Field of Search ................. 244/142, 153 R, 145, 244/155 A, 151 B, 902, 154

[56] References Cited

U.S. PATENT DOCUMENTS

| | | | |
|---|---|---|---|
| 3,700,191 | 10/1972 | Page ......................... | 244/142 |
| 3,806,071 | 4/1974 | Brown ..................... | 244/153 R |
| 4,846,424 | 7/1989 | Prouty ..................... | 244/155 A |
| 4,865,272 | 9/1989 | Schwarz ................... | 244/145 |

Primary Examiner—Joseph F. Peters, Jr.
Assistant Examiner—Christopher P. Ellis
Attorney, Agent, or Firm—Fleit, Jacobson, Cohn, Price, Holman & Stern

[57] ABSTRACT

The curve profile of the front edge of an air-filled wing or sports kite of a type which is guided from the ground is maintained without the use of any bracing system. This curve profile, which is very important in determining the flight characteristic of the wing, is controlled exclusively by adjusting the various lengths of balance lines. Two symmetrical line bundles or connecting balances radiate from end points of at least two steering lines and are fastened to various points on the wing base. If so desired, central balance lines can be connected to the wing base without intermediate fastenings. The fastening points on the wing base are located chiefly at the front portion of the wing base. The lengths of the various balance lines preferably increase from the side edges to the middle. However, the rate at which the balance line length becomes greater can increase, decrease, or remain constant, at least in certain areas.

9 Claims, 6 Drawing Sheets

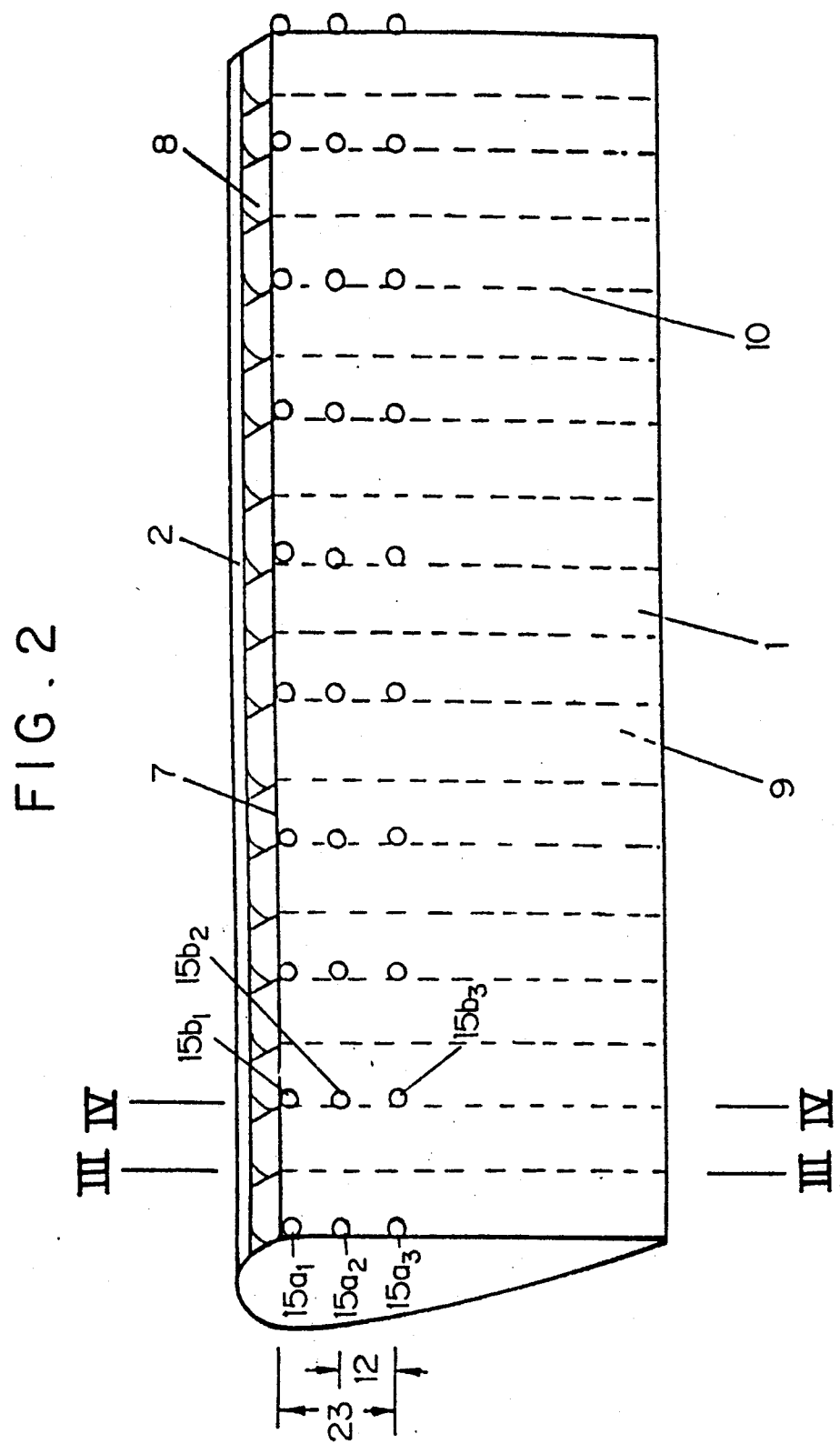

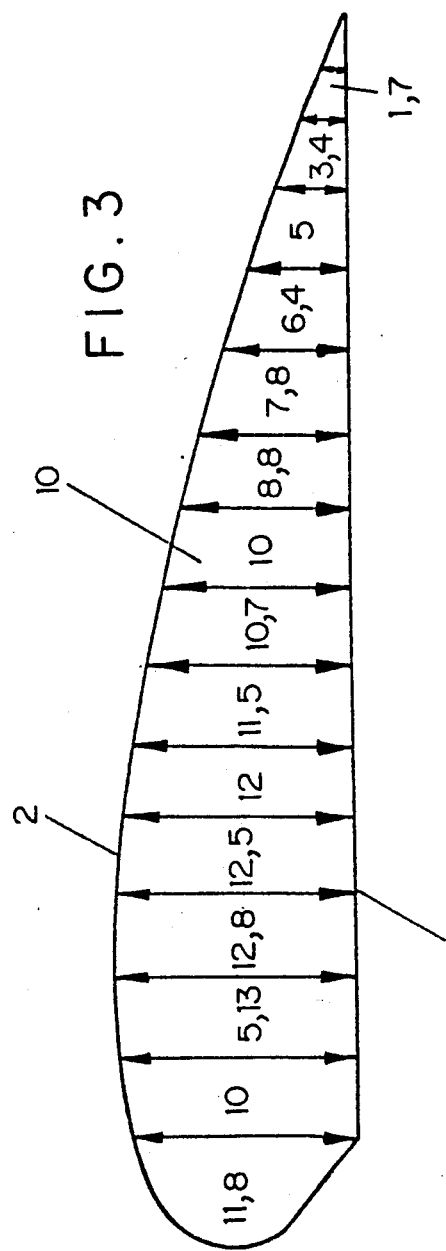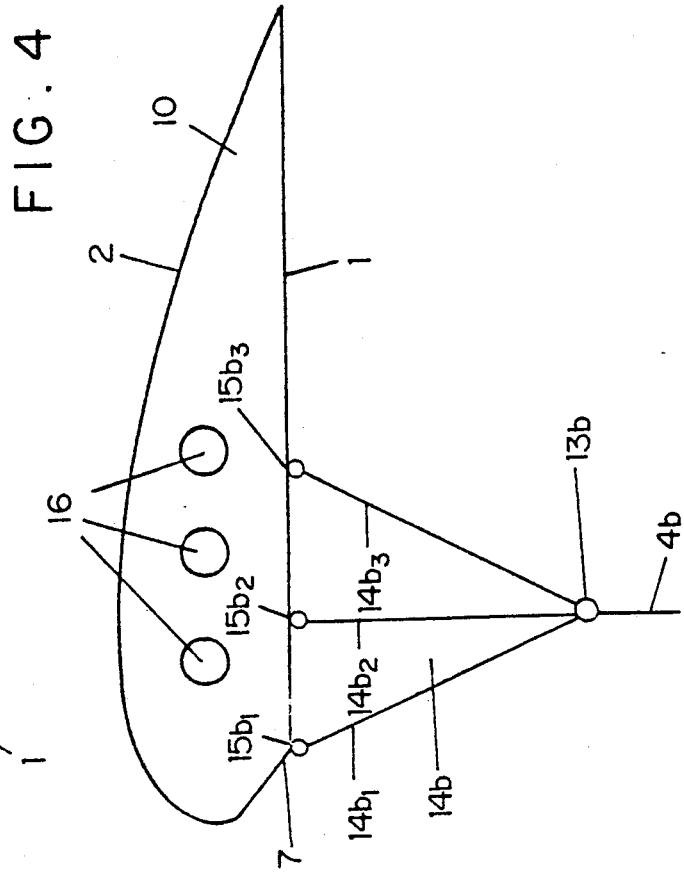

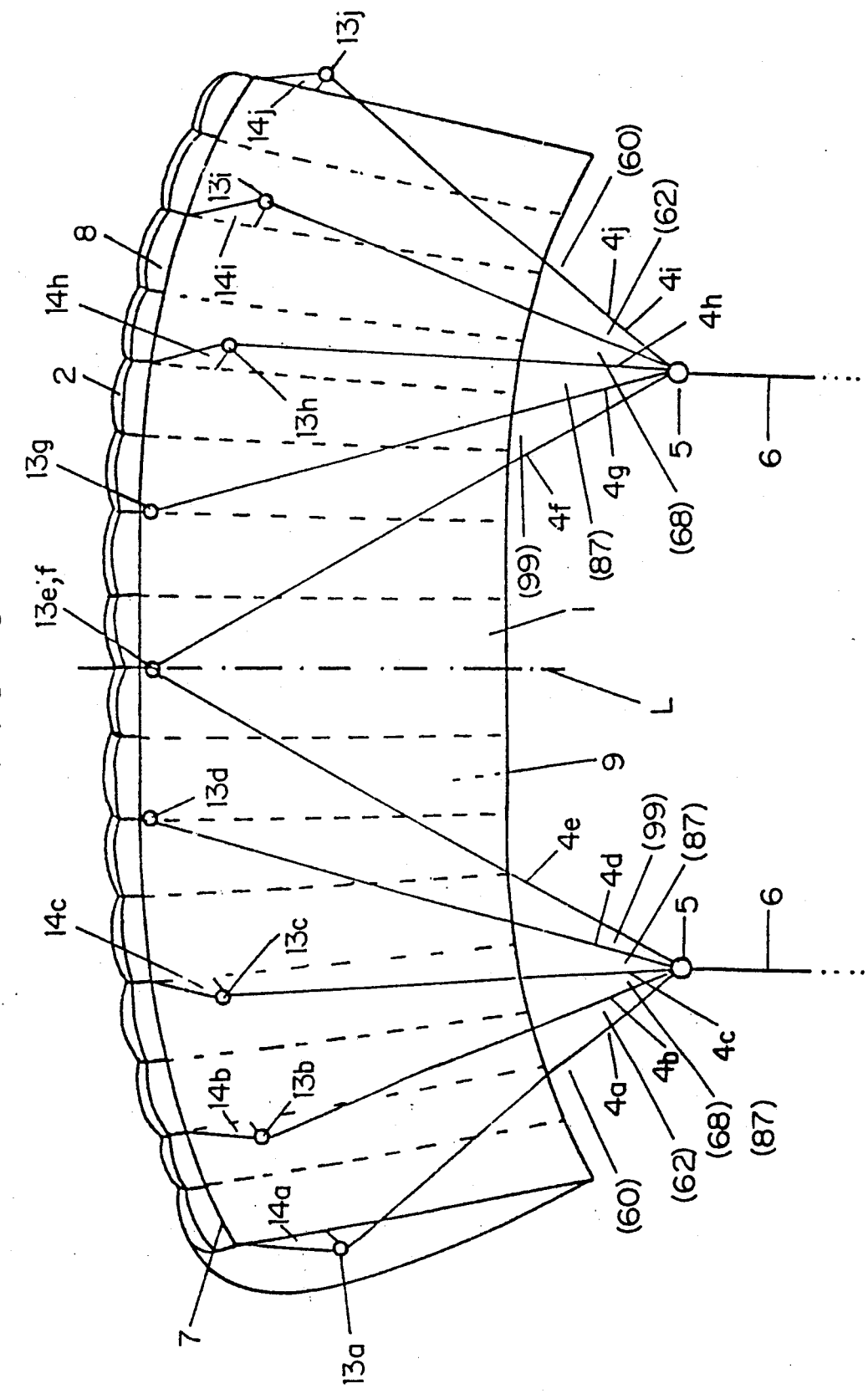

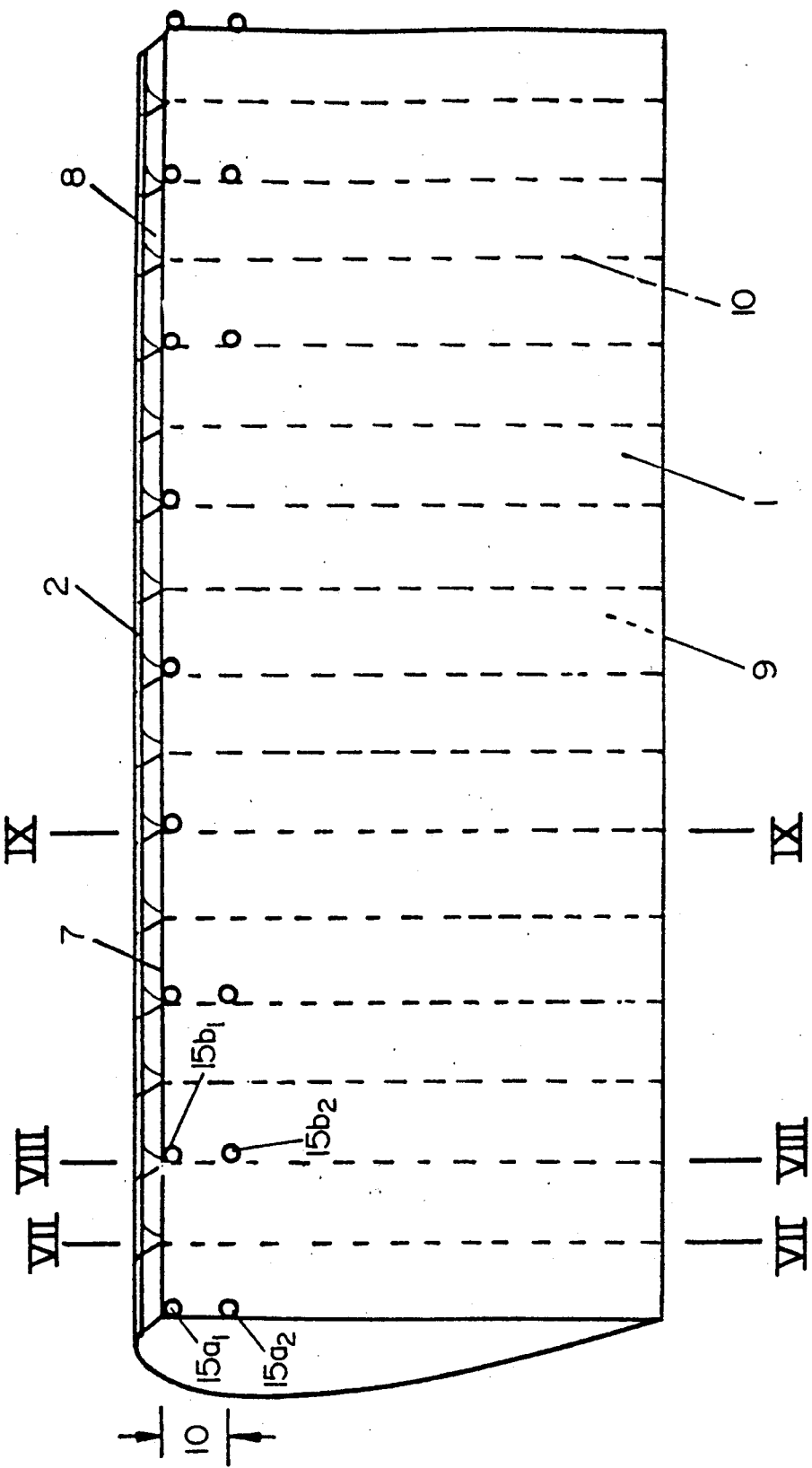

GUIDED KITE WITH STABLE YET ADJUSTABLE CURVE PROFILE

BACKGROUND OF THE INVENTION

The invention relates to a sport kite, i.e., an air foil or wing, which can be guided from the ground according to a known guidance principle utilizing at least two steering lines and air-filled, parafoil wings, typically made of rip-stop nylon. Such sport kites, which are guided from the ground by two lines simultaneously serving as attachment and steering lines, are known as "flexifoils". In sport kites such as that of the present invention, the particular curve profile of the wing, and especially of the front edge of the wing, is very important in determining flight capability and maneuverability. The desired curve profile is typically provided in known guided kites by a multi-part, rigid rod system with a shape corresponding to the desired curve profile. The rigid rod system is inserted into a pocket positioned in the front edge of the kite or wing and retained there. The system includes a middle portion that is cylindrical in shape, and outer parts which taper conically outward.

It is also known from the prior art to give a wing its needed stability and shape by means of a bracing housed in a pocket of the front edge of the kite or wing. The bracing is composed of a material lighter and softer than metal, e.g., an expanded rigid polystyrene plastic such as Styrofoam.

The present invention relates to a sports kite or wing which is completely free of any kind of bracing. This results in a reduction in weight as compared to other constructions as well as better transportability, improved flight characteristics, such as making the kite capable of flying in narrower, i.e., smaller, curves, and reduced production costs. These advantages are made possible by the elimination of the pocket which previously has been necessary to house the rigid rod system or bracing. The invention instead uses additional balance lines to provide the kite with the desired curve profile.

SUMMARY OF THE INVENTION

This technical advance is made possible by application of a novel line guidance principle to the sports kite of the present invention. This principle, which is adapted in modified form from its use in connection with glide parachutes, consists of establishing and stabilizing the curve profile of the wing through the use of lines connected to the wing rather than by means of material type bracing. The wing is symmetrically filled with air relative to its longitudinal axis. The curve profile of the wing is established exclusively by means of coordinating the largely differing lengths of various balance lines. Two symmetrical line bundles are provided. The balance lines are attached at various points on the wing base, either directly or by means of intermediate fastenings.

In known glide parachutes the balance lines used for steering are operated separately from the balance lines serving to the carry the load (e.g., the parachute jumper). The balance lines used for steering are separated from the load carrying balance lines and are attached at the back part of the wing base. By way of contrast, the balance lines in the inventive sports kite, which does not carry a load, are designed to radiate outwards as bundles from the end of each steering line. The bundles serve both to steer the kite and to stabilize the curve profile of the wing.

According to a preferred embodiment of the invention, the attachment points of the balance lines are not uniformly distributed over the base of the wing. The balance lines are preferably distributed only in the forward area of the wing base, and ideally on the front edge or in the immediate vicinity of the front edge of the wing base. In the rear area, and particularly in the rear 50% to 60%, and more advantageously 75% to 80% of the rear wing surface, fewer balance lines are fastened. It is preferable to have no balance lines at all fastened to this portion of the wing.

Preferably, at least the outermost balance lines are not directly fastened to the wing base, but rather are attached to the wing base by means of intermediate fastenings formed by pieces of fabric, preferably triangular in shape. Intermediate fastenings of this type are known as "keels". It is also known to replace these fabric triangles with triangularly positioned lines. According to the preferred embodiment of the invention, the keels in their entirety rather than only a portion of these keels are replaced by triangularly positioned lines, without fabric covering.

BRIEF DESCRIPTION OF THE DRAWINGS

Two embodiments of the invention are described in greater detail below. FIGS. 1 to 4 illustrate a first embodiment of the invention, while FIGS. 5 to 9 illustrate a second embodiment thereof.

FIGS. 1 and 5 are perspective views of the two guided kite embodiments according to the present invention.

FIGS. 2 and 6 are respective views from below the kites illustrated in FIGS. 1 and 5, from which balance lines have been omitted for the sake of simplicity.

FIGS. 3 and 7 are sectional views along lines III—III and VII—VII of FIGS. 2 and 6, respectively.

FIGS. 4 and 8 are sectional views along lines IV—IV and VIII—VIII of FIGS. 2 and 6, respectively.

FIG. 9 is a sectional view along line IX—IX of FIG. 6.

DESCRIPTION OF THE PREFERRED EMBODIMENTS

Figure 1:
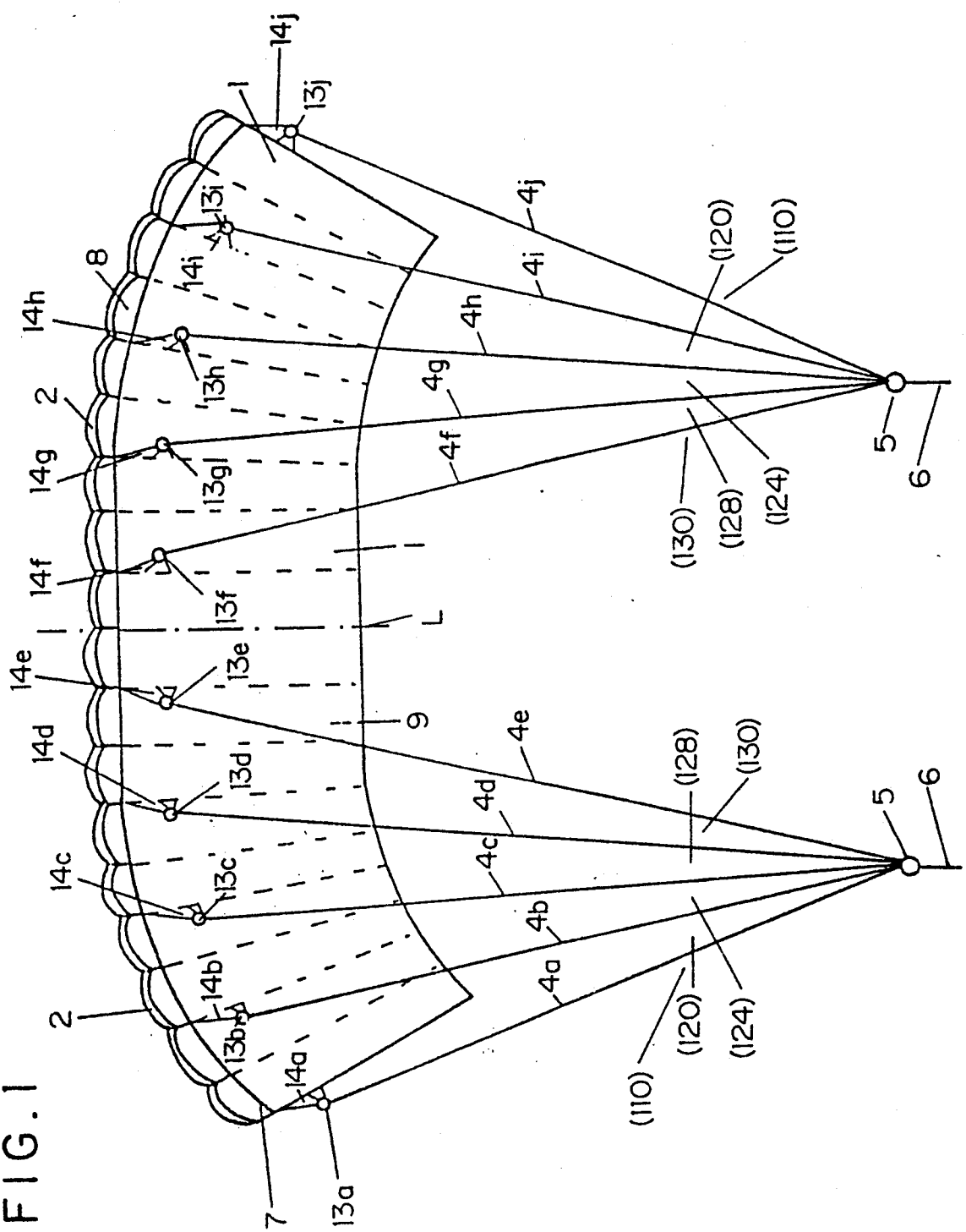
Figure 7:
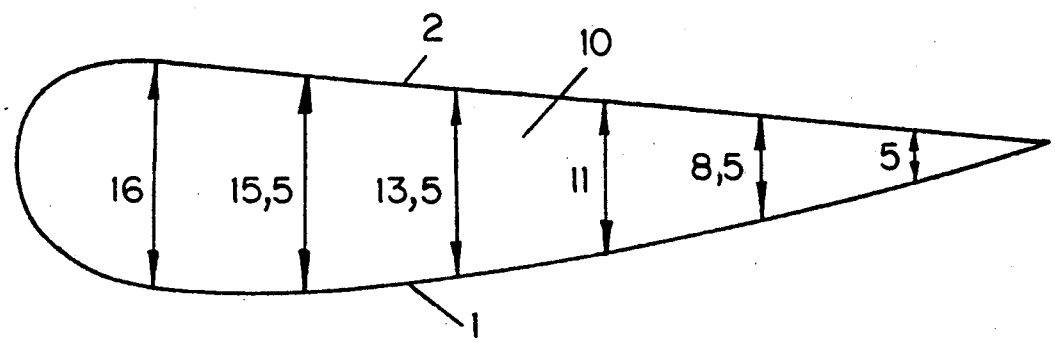
Figure 8:
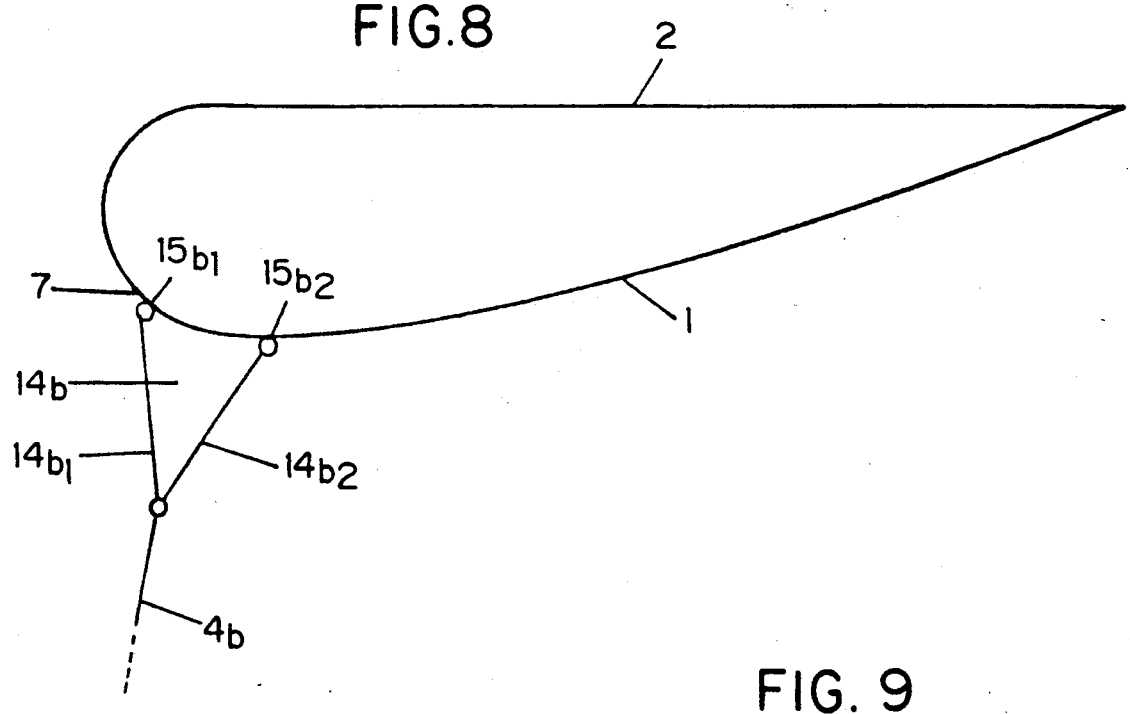
Figure 9:
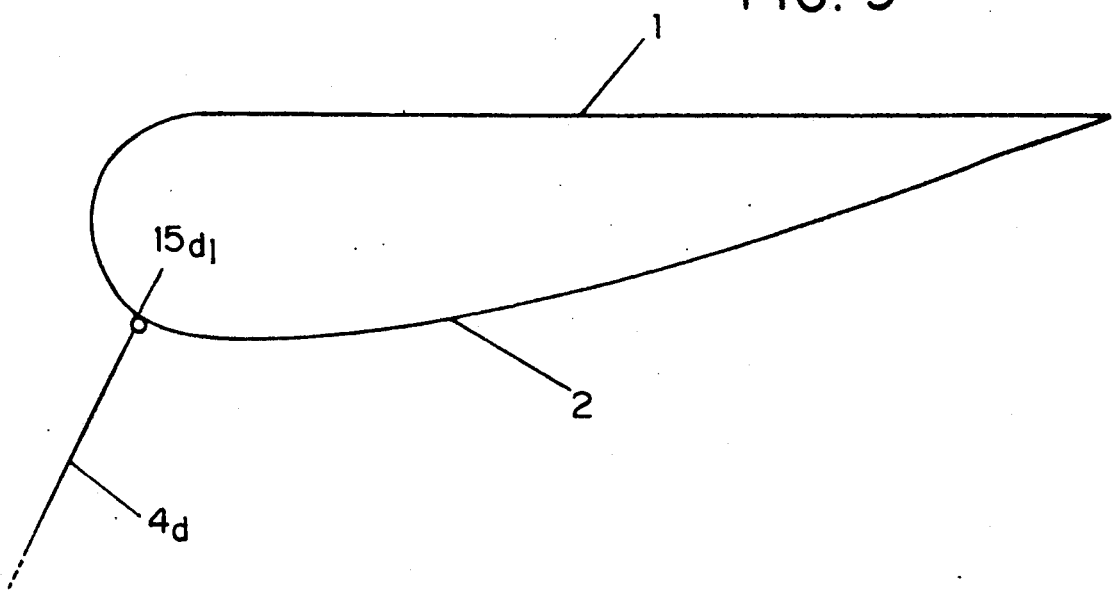

In the drawing figures, reference numeral 1 denotes the base and reference numeral 2 the cover of an inventive kite or wing according to the present invention. Positioned just above the front edge 7 of the wing base are air intake openings 8. Air flows into compartments 9, into which the interior of the wing is divided, through these air intake openings during operation or use of the wing. The spatial contour of the wing itself is established by the varied height of each of a plurality of compartment walls 10, which divide the interior of the wing into compartments 9. To equalize the pressure between the individual compartments 9, openings 16 in compartment walls 10 may be provided. Openings 16 are shown in FIG. 4, but for the sake of simplification are not shown in FIG. 3. The relative dimensions of compartment walls 10 are indicated for further clarification in FIG. 3.

As can be seen from the drawing figures, and in particular, from FIGS. 1, 4, 5, and 8, balance lines 4a–4j radiate, in two symmetrical bundles, from end points 5 of steering lines 6. Referring to FIGS. 1 and 4, intermediate fastenings 14a–14j are attached to the respective end points 13a –13j of balance lines 4a–4j, respectively. According to the present invention, intermediate fastenings 14a–14j are formed by connecting balances, or line systems, consisting of at least two lines which radiate from a single point to least two attachment points. For example, referring to FIG. 4, the intermediate fastening 14b is formed by three lines, $14b_1$, $14b_2$ and $14b_3$, which are secured in any known manner so as to attach with corresponding points $15b_1$, $15b_2$ and $15b_3$ on the base 1. Keels may be used in place of intermediate fastenings 14a–14j.

The embodiments illustrated in FIGS. 1–4 and in FIGS. 5–9 differ in several ways. In the second embodiment illustrated in FIGS. 5–9, third lines $14a_3$ to $14j_3$, which are present in the intermediate fastenings of the first embodiment in FIGS. 1–4, have been eliminated. Also, as is apparent from FIG. 5, in the second embodiment, the two innermost balance lines 4e and 4f are jointly attached to a single point 13e, f on the front edge of base 1 without the use of an intermediate fastening. By contrast, in the first embodiment of the wing illustrated in FIGS. 1–4, the two innermost balance lines 4e and 4f are connected to base 1 at two different places and through respective intermediate fastenings 14e and 14f. Further, in the second embodiment, balance lines 4d and 4g, i.e., those balance lines which, moving outward from the central longitudinal axis L of the wing, are adjacent the innermost balance lines 4e and 4f, are also directly attached to the front edge of the base 1 without intermediate fastenings. By contrast, balance lines 4d and 4g of the first embodiment are attached to base 1 through respective intermediate fastenings 14d and 14g, respectively. The number of compartments is different in the first and second embodiments. Compartment walls 10 divide the interior of the wing illustrated in FIGS. 1–4 into 18 separate compartments 9. By contrast, walls 10 divide the interior of the wing shown in FIGS. 5–8 into only 16 separate compartments. Moreover, the connecting holes 16, which are present in walls 10 of the first embodiment to provide communication between compartments 9, have been omitted from the compartment walls 10 of the second embodiment. Additionally, as can be seen by a comparison of FIGS. 3 and 7, the cross-sectional wing contours of the two embodiments differ. Finally, bends in the front edge of the wings also are slightly different.

The flight performance and maneuverability of the inventive kite can be optimized by providing the correct curve to the front edge 7 of base 1 and thus to the entire guided kite. According to the present invention, such a correct curve is defined and maintained by the appropriate manual adjustment of the various lengths of the balance lines 4a–4j between end points 5 and 13a–13j. Any known manner can be used to adjust the lengths of balance lines 4a–4j In the illustrated embodiments, the varying relative lengths are indicated in brackets in FIGS. 1 and 5. For the best performance, the varying lengths of the balance lines should increase from the lateral edges of the wing toward the central longitudinal axis thereof. At the same time, the rate at which the lengths of the balance lines increase, in the same direction, can increase, decrease or remain the same.

I claim:

1. A guided kite, which can be steered from the ground, comprising:
   an air-filled wing having a cover and a base with air-intake openings on a front edge thereof,
   at least two steering lines,
   several balance lines interconnecting said at least two steering lines with said air filled wing, and
   intermediate fastenings positioned between the end points of at least some of the balance lines and the base of the wing, wherein a symmetrical bundle of said balance lines diverges from each of the at least two steering lines, the differing lengths of the balance lines being so adjusted that only by means of a combined effect of pulls exerted by the variously long balance lines on the base is the curve profile of the wing, and particularly the front edge of the wing, which is free of any bracing system, defined and maintained in operation.

2. A guided kite as defined in claim 1, wherein all of said intermediate fastenings between the balance lines and the base of the wing consist of connecting balances without fabric covering.

3. A guided kite as defined in claim 1, wherein a main part of the end points of the intermediate fastenings are themselves attached to the front area of the base of the wing.

4. A guided kite as defined in claim 3, wherein the rear area of the base of the wing has no fastening points for the balance lines or for the intermediate fastenings.

5. A guided kite as defined in claim 3, wherein the rear area of the wing, in which there are neither balance lines nor intermediate fastenings, comprises at least 50% and preferably 75% to 80% of the wing surface.

6. A guided kite as defined in claim 1, wherein the differing lengths of the balance lines in each symmetrical bundle increase from the edge of the wing toward the middle.

7. A guided kite as defined in claim 6, wherein the rate of increase in length of the balance lines decreases from the edge of the wing toward the middle.

8. A guided kite as defined in claim 7, wherein the length of the balance lines from the outside to the inside increases in the approximate ratio 110:120:124:128:130.

9. A guided kite as defined in claim 1, wherein the ratio of the lengths of the various balance lines is adjusted so that their combined pull maintains the wing's front edge in a shape backwardly curved on both sides and straight in the middle.

* * * * *